US006453251B1

(12) United States Patent
Fuchs et al.

(10) Patent No.: US 6,453,251 B1
(45) Date of Patent: Sep. 17, 2002

(54) TESTING METHOD FOR COMPONENTS WITH RECEPTION CAPABILITIES

(75) Inventors: Andreas Dirk Fuchs, Orion, MI (US); Roman Blank, Hildesheim (DE)

(73) Assignee: Receptec LLC, Holly, MI (US)

( * ) Notice: Subject to any disclaimer, the term of this patent is extended or adjusted under 35 U.S.C. 154(b) by 0 days.

(21) Appl. No.: 09/413,765

(22) Filed: Oct. 7, 1999

(51) Int. Cl.$^7$ ............................................... H04N 5/782
(52) U.S. Cl. .............................. 702/69; 702/71; 702/81
(58) Field of Search .............................. 702/57, 66, 69, 702/71, 81, 121; 343/876; 455/31.1, 67.1–67.4, 226.1; 725/135

(56) References Cited

U.S. PATENT DOCUMENTS

| | | | |
|---|---|---|---|
| 4,972,275 A | * 11/1990 | Sptiz et al. | .................... 360/55 |
| 5,289,178 A | * 2/1994 | Schwendeman | ........... 340/7.58 |
| 5,584,051 A | * 12/1996 | Göken | .......................... 455/68 |

FOREIGN PATENT DOCUMENTS

JP     11275032     * 10/1999

OTHER PUBLICATIONS

J. Middleton, Prediction of VHF/UHF Mobile Reception, BBC, Tadworth, UK, Abstract, 1989.*
Duckeck, Field Strength Measurements for Car Radios., Funkschau Journal vol. 50, No. 25, Abstract, Dec. 1978.*
Perinic, Angle and Space Diversity Comparisons in Different Mobile Radio Environments, IEEE, Catalog #99TH8403. Abstract, 1999.*

* cited by examiner

*Primary Examiner*—Marc S. Hoff
*Assistant Examiner*—Craig Steven Miller
(74) *Attorney, Agent, or Firm*—Warner Norcross & Judd

(57) ABSTRACT

A method for comparing the quality of components with signal reception capabilities. The method generally includes the steps of: (1) providing at least two test vehicles, each equipped with a component to be tested, (2) providing each vehicle with a device for recording the output of the component to be tested, (3) providing at least one of the two vehicles with a video recording device, (4) simultaneously traveling a test route with the two vehicles remaining in close proximity, (5) recording the output signals of the two components to be tested as the vehicles travel the test route, (6) providing a video recording of the vehicles traveling the test route and (7) comparing the recorded signals of the two components while taking into consideration environmental conditions shown in the video recording. The present invention also provides a method for automatically rating the sound quality of a recorded FM broadcast. The method generally includes the steps of (1) computing the average signal level at a frequency above the normal FM modulation frequency, (2) computing the average signal level of the FM pilot signal and (3) subtracting the average signal level computed in step (1) from the average signal level of the FM pilot signal.

28 Claims, 5 Drawing Sheets

TESTING METHOD FOR COMPONENTS WITH RECEPTION CAPABILITIES

BACKGROUND OF THE INVENTION

The present invention relates to testing methods and more particularly to methods for testing components having broadcast signal reception capabilities.

Because of consumer demand, the automotive industry has placed high emphasis on providing vehicles with high quality audio and reception systems. This is true not only in high end vehicles, but also in mid- to low-end vehicles. To achieve high quality sound when playing AM and FM broadcasts, it is imperative that the audio system include a high performance reception system. Without high quality signal reception, even the most advanced audio systems are incapable of providing the desired sound quality when playing AM and FM broadcasts.

Conventionally, vehicle audio systems, and particularly reception systems for vehicle audio systems, are tested or evaluated by assembling a team of individuals ("raters") who ride in the vehicle and listen to the audio system as the vehicle travels a predetermined test route. The route is selected to travel through selected geographical areas where defects in the broadcast signal are likely to occur. For example, the route is selected to pass through areas where such defects as intrusion, overload, multipath and adjacent channel interference are likely to occur. By listening to the audio system throughout the test route, raters are capable of determining when various problems are present in the broadcast signal. Based on this analysis, the raters are able to provide a subjective opinion of the quality of sound produced by the audio system. To compare the quality of two different systems, the raters may travel the same route in a separate vehicle with a second system, and make comparisons between the sound and reception quality produced by the two systems.

This conventional method of testing and evaluation suffers from numerous deficiencies related to the availability and quality of raters, the comparative value of data used as the basis for assessment, and the precise timing and location of the test.

First, it is difficult to coordinate and assemble a team of raters to participate in extensive test activities, and it is even more difficult for that team to provide a high degree of experience and consistency in judgment.

Second, it is difficult for a team of raters to form a comparative assessment of alternative audio and reception systems based on the same data and using objective standards, since the assessment is necessarily instantaneous and judgmental.

Third, it is impossible to form an opinion of sound and reception quality, which is not affected by background noise such as might be caused by traffic, road conditions, weather and even conversation in the vehicle.

Finally, it is impossible for one rater to compare the quality of alternative audio or reception systems under identical broadcast conditions. The relative capabilities of such systems to provide quality output can only be accurately assessed at the precise moment of broadcast since that quality is significantly affected by broadcast content (e.g. classical music, rock music or voice), frequency modulation, weather conditions (e.g. cloudy or sunny), direction (eg north, south etc.) and location (e.g. under an overpass, through a tunnel, next to a tall building, near to power lines etc.).

SUMMARY OF THE INVENTION

The aforementioned problems are overcome by the present invention wherein a testing method is provided that permits direct comparison of audio and reception systems, and components thereof, such as antennas or radio receivers. The method generally includes the steps of: (1) providing at least two test vehicles, each equipped with a component to be tested, (2) providing each vehicle with a device for recording the output of the component to be tested, (3) providing at least one of the two vehicles with a video recording device, (4) simultaneously traveling a test route with both the vehicles remaining in close proximity, (5) recording the output signals of the components being tested as the vehicles travel the test route, (6) providing a video recording of the vehicles traveling the test route, (7) playing back at least portions of the recorded output while simultaneously playing back the corresponding portions of the recorded video, and (8) comparing the played-back portions of the recorded audio output of the components in view of the environmental conditions reflected in the played-back portions of the recorded video to provide a relative comparison of the quality of the components.

The present invention provides an effective testing method that permits greater consistency and accuracy. The system permits output generated from the same broadcast signals received at the same time and location to be directly and repeatedly compared, thereby eliminating the inherent deficiencies caused by comparing output generated by different signals at different times and locations. The system especially permits the output recordings to be analyzed by a single rater, thereby eliminating the inconsistencies resulting from differences in the subjective rating methods of different raters. The recordings can also be analyzed under lab conditions, eliminating problems caused by background noise encountered outside of the lab. Further, the video recording permits environmental conditions to be taken into account in rating the components during playback. By viewing the environmental conditions simultaneously with the recorded audio, noise and other deficiencies in the output resulting from environmental conditions can be properly assessed.

In a preferred embodiment, the recording devices are connected to the speaker output of the component being tested, such as an AM/FM receiver. This eliminates background noise as well as noise generated by the speakers or by the electrical circuit feeding the speakers.

In another preferred embodiment, the recorded signals are analyzed using a computer analysis system. The system permits the audio and video recordings to be synchronized and then analyzed under laboratory conditions. A single rater can thus test two separate systems producing sound from the same broadcast. The computer analysis system permits the recordings to be played in a variety of different modes that facilitate direct comparison of the sound recordings from the two components. For example, the system can play the same time interval of sound from both components to permit a more accurate comparison. Further, by reviewing the video recording simultaneously with the audio recording, the rater can take environmental conditions into consideration when rating the components.

The computer analysis system also provides the ability to plot the relative amplitude of the recorded audio over a range of frequencies. This permits the analyst to make a visual comparison of different audio recordings. In a preferred embodiment, the system provides the ability to plot two separate audio recordings simultaneously so that direct comparisons of the two audio recordings are possible.

In another aspect, the present invention provides a method for evaluating the quality of an audio recording. The method generally involves analyzing the level of any signals present outside the frequency range of normal sound. A particularly efficient embodiment of this method useful with FM broadcasts is to compute the difference between the relative amplitude of the FM pilot signal at 19 KHz with the relative amplitude of sound at 17 KHz. This method provides an objective rating from which to objectively compare the quality of different components. By computing the difference between the pilot signal at 19 KHz and the noise at 17 KHz, variations in the volume settings between two components can be taken into account in the rating.

These and other objects, advantages, and features of the invention will be readily understood and appreciated by reference to the detailed description of the preferred embodiment and the drawings.

DETAILED DESCRIPTION OF THE PREFERRED EMBODIMENT

I. Overview

The present invention is directed to a method for evaluating the quality of components having broadcast reception capabilities, such as automotive sound systems. For purposes of disclosure, the present invention will be described in connection with the testing of two different reception systems for automotive sound systems. The present invention is, however, well-suited for use in testing a wide variety of components having signal reception capabilities, such as cellular phones, AM/FM receivers and the like.

Figure 1:
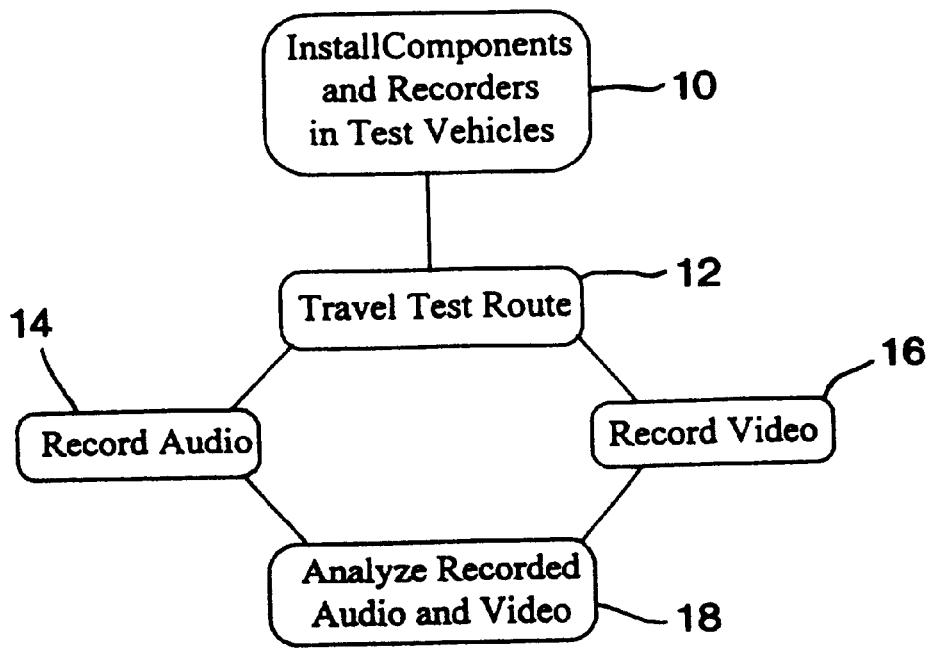
FIG. 1 is a flow chart showing the general steps of the quality comparison method of the present invention.

The general steps of the testing method are shown in FIG. 1. The method generally includes the steps of (a) installing 10 the reception systems to be tested in separate vehicles, (b) simultaneously traveling 12 through a test route with the vehicles in close proximity, (c) recording 14 the audio output of the tuner (or receiver) while the vehicles travel through the test route, (d) recording 16 a video recording of the vehicles traveling through the test route, and (e) after the vehicles have completed the test route, analyzing 18 the recorded audio output simultaneously with the recorded video to provide an evaluation of the quality of the tested reception systems.

Figure 2:
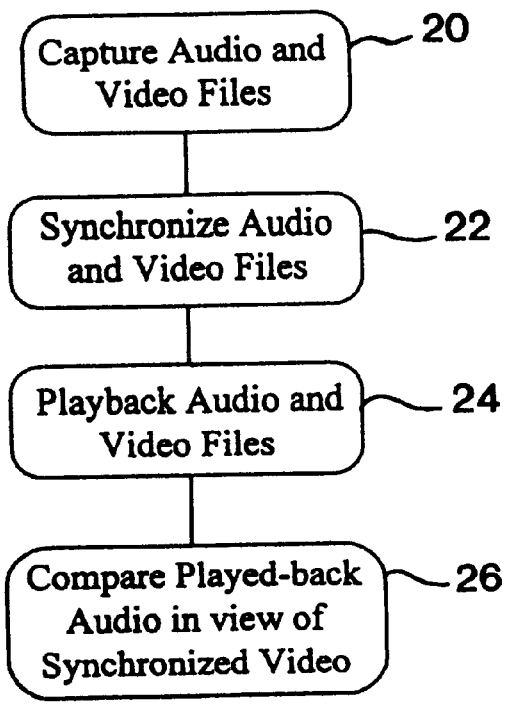
FIG. 2 is a flow chart showing the general steps of the playback/analysis method of the present method.

In a second aspect, the present invention provides a method for analyzing the recorded information. The general steps of this method are illustrated in FIG. 2. As shown, the method includes the steps of (a) capturing 20 the recorded audio and recorded video as audio and video files in a computer, (b) synchronizing 22 the captured audio and video files, (c) playing back 24 at least portions of the audio files and video file in concert and (d) comparing 26 the audio output of the audio files in view of the video recording to provide a relative rating of the test components.

Figure 3:
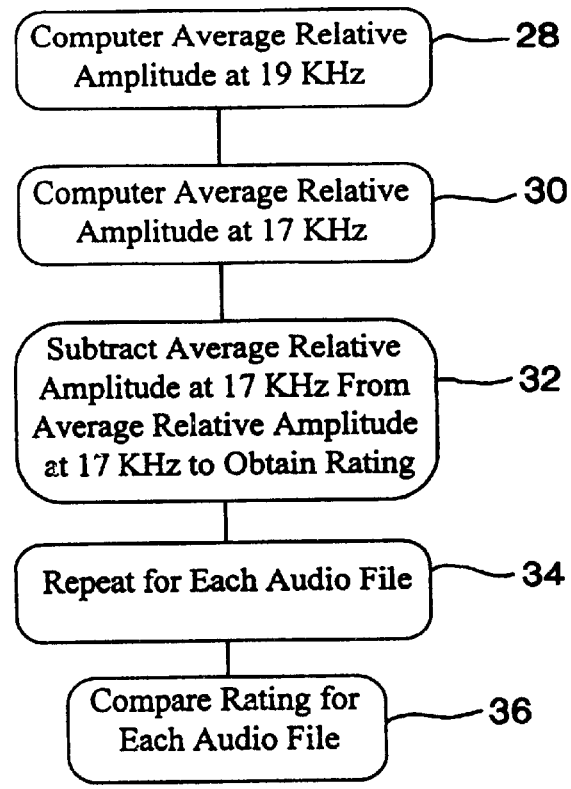
FIG. 3 is a flow chart showing the general steps of the automatic rating method of the present invention.

In a third aspect, the present invention provides a method for objectively analyzing and comparing the quality of recorded audio output. As illustrated in FIG. 3, the method includes the steps of (a) computing 28 the average relative amplitude of an audio file at a frequency of 19 KHz, (b) computing 30 the average relative amplitude of the audio file at a second selected frequency above about 15 KHz and below about 19 KHz, (c) subtracting 32 the computed average relative amplitude of sound at the second selected frequency from the computed average relative amplitude of sound at 19 KHz to provide an objective rating, and (d) repeating 34 these steps for each audio file. The computed objective ratings of the audio files can be compared 36 to provide an objective indication of the relative quality of the tested components.

II. Recording Methods and Apparatus

To provide the most meaningful comparison between two reception systems, the comparison should be made with the two systems receiving the same broadcasts at the same time and in approximately the same location. If not, variations in the type of signal being broadcast (e.g. music, audio, etc.), the frequency of modulation and environmental conditions can significantly affect the comparison.

As outlined above, the method for recording test data generally includes the steps of: (a) installing 10 the reception systems (e.g. fixed mast antenna and glass antenna) to be tested in separate vehicles, (b) simultaneously traveling 12 through a test route with the vehicles in close proximity, (c) recording 14 the audio output of the receiver while the vehicles travel through the test route and (d) recording 16 a video recording of the vehicles traveling through the test route. It is sometimes desirable to compare the quality of components tested in different test runs. Direct comparisons between recordings made during different test runs are suspect because noise levels between different test runs will deviate significantly due to the factors discussed above, including variations in environmental conditions. To permit meaningful comparisons, the output from a reference system can be recorded during each test run, preferably by including a test vehicle fitted with the reference system in each test convoy. The reference vehicle permits the rater or analyst to make comparisons between components of different test runs by comparing the relative quality of the test components against the corresponding reference components.

In order to collect audio output, the reference and test vehicles are equipped with an audio recording device, such as a digital audio tape ("DAT") recorder. DAT recorders provide high quality sound recordings and are therefore particularly well-suited for use in the present invention. DAT recorders are commercially available from a wide variety of well-known suppliers. The DAT recorders preferably include conventional analog input and digital output jacks to permit the DAT recorders to record analog output from the receiver and provide digital output to the computer analysis system as described in more detail below. A DAT recorder is preferably connected to the speaker output of the receiver in each test vehicle.

In addition to the audio recording device, at least one of the vehicles is equipped with a video recording device, such as a digital camcorder. The digital camcorder is preferably mounted to the dash within the vehicle that will travel last in the convoy, typically the reference vehicle. This permits the camcorder to record the preceding vehicles while simultaneously recording the test route, including the environmental conditions encountered along the route. The video recording permits the rater to be aware of environmental conditions when later reviewing the audio recordings taken along the test route. Further, by video recording all of the test vehicles, the rater can confirm that the vehicles remained in close proximity to one another throughout the test route.

The test route is selected to pass through regions in which particular test conditions (or defects in the signal) are likely to occur. For example, with respect to AM broadcasts, the test route may pass through regions in which signal intrusion, signal overload, weak station fade out and power line noise are likely to be encountered. With respect to FM broadcasts, the test route may be selected to pass through regions where signal overload, multipath fading, adjacent channel interference, medium strength signal and weak station fade out are likely to occur. These and other "test conditions" are well-known and can be addressed by selecting the appropriate test route. The creation and use of test routes is also well-known, and will not be described in detail.

The present invention is described in connection with the testing of two reception systems. Accordingly, two test vehicles are provided and each is equipped with one of the two reception systems to be tested. To help ensure that any differences in the recorded audio output are attributable to the receptions systems, the vehicles are preferably equipped with identical sound systems (e.g. receivers, speakers, etc.). DAT recorders are connected to the speaker output of the receiver for each system. In addition, a reference vehicle is fitted with a reference sound system as well as a DAT recorder and a video recorder. The DAT recorder is connected to the speaker output of the reference receiver. The video recorder is mounted to the dash of the reference vehicle to record video through the windshield of the test vehicle, thereby recording the preceding test vehicles as well the environmental conditions encountered during the test run.

Once the vehicles are properly fitted, the reference and test vehicles are ready to collect test data. The test and reference vehicles are then driven to the beginning of the test route. In the preferred embodiment, both AM and FM broadcasts will be recorded, thereby permitting later analysis of both AM and FM reception. The audio system for each of the vehicles is then set to the pre-determined frequency and band, such as 94.5 FM. The audio and video recorders are then started and the vehicles begin to travel through the test route in convoy. Effort is made to maintain the vehicles in close proximity so that they are subject to essentially the same environmental conditions throughout the test route. The reference vehicle is driven at the rear of the convoy with the video recorder recording the environment and the test vehicles as they travel through the test route. If desired, the recorded broadcast frequency can vary between different legs of the test route. For example, the vehicles may approximately simultaneously switch from one station to another for different portions of the test route. Once the vehicles have completed the FM portion of the test route, the audio systems are switched to the desired frequency in the AM band. The vehicles then convoy through the AM portion of the test route while again recording both audio and video. As with the FM band, the vehicles may approximately simultaneously switch between different AM broadcast frequencies during the test. The order in which the AM and FM bands are tested is not material and may vary from application to application.

III. Preparing the Test Data for Analysis

Once the test data (i.e. the audio recordings and video recording) is collected, it is brought back to the lab for evaluation. In the preferred embodiment, the test data is evaluated with the aid of a computer analysis system. The computer analysis system includes audio and video capabilities which permit the analyst to capture and synchronize the audio and video recordings. The analyst can then play back at least selected portions of the captured audio and video recordings in concert to provide a relative comparison of the quality of the two tested reception systems. The analyst can also plot the relative amplitude of the captured audio recordings, thereby permitting a visual comparison of the captured audio recordings.

Figure 7:
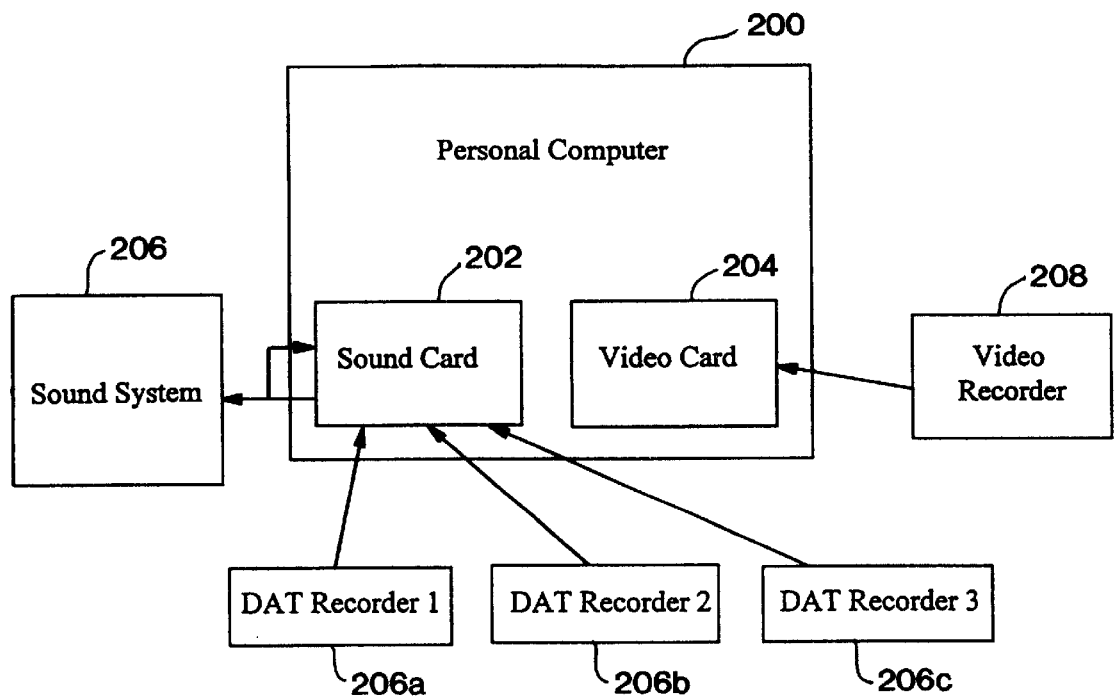
FIG. 7 is a schematic diagram of the general hardware components of the present invention.

In general, the computer analysis system includes a high-performance personal computer 200 having a variety of audio and video accessories (See FIG. 7). To provide the processing power needed to perform real-time analysis, the computer preferably includes dual-500 MHz Pentium processors (not shown) and 128M of RAM (not shown), as well as high speed SCSI interfaces for the hard drive and CD drive (not shown). To permit capture of the audio and video recordings, the computer 200 preferably includes a conventional full duplex sound card 202, such as a SoundBlaster Live card available from Creative Labs, Inc., and a conventional video capture card 204, such as Matrox Marvel card available from Matrox Graphics Inc. The SoundBlaster Live sound card (or other sound card) also provides high-quality audio output to an external sound system 206. As described below, off-the-shelf audio and video software as well as a customized piece of software are installed on the computer to manage the audio and video capture and playback processes.

The audio recordings from the test and reference vehicles are captured by the computer using conventional techniques and apparatus. The audio files are preferably captured in the computer 200 using a conventional sound card 202 and off-the-shelf audio software, such as WaveLab software available from Steinberg. The digital output of the DAT recorders 206*a*–*c* is preferably connected directly to the digital input of the sound card 202 using conventional audio cables. If the DAT recorders 206*a*–*c* do not provide digital output or the sound card 202 does not accept digital input, the data can be loaded using conventional analog-to-digital or digital-to-analog circuitry. The various audio recordings from the different DAT recorders 206*a*–*c* are separately captured and stored by the computer 200 in a conventional storage device (e.g. hard disk) as separate audio files. The audio files are preferably stored in a standard audio file format, such as ".wav" format.

The video file is captured by the computer 200 using a conventional video capture card 204 and conventional video software, such as Matrox PowerDesk by Matrox Graphics Inc. The output of the video recorder 208 is connected to the video card 204 using conventional cables and connectors, such as an S-video connector. The video recording is then captured in a conventional manner and stored by the computer 200 in a conventional storage device (e.g. hard disk) as a video file in a standard video file format, such as ".avi" or ".mov" format.

Figure 8:
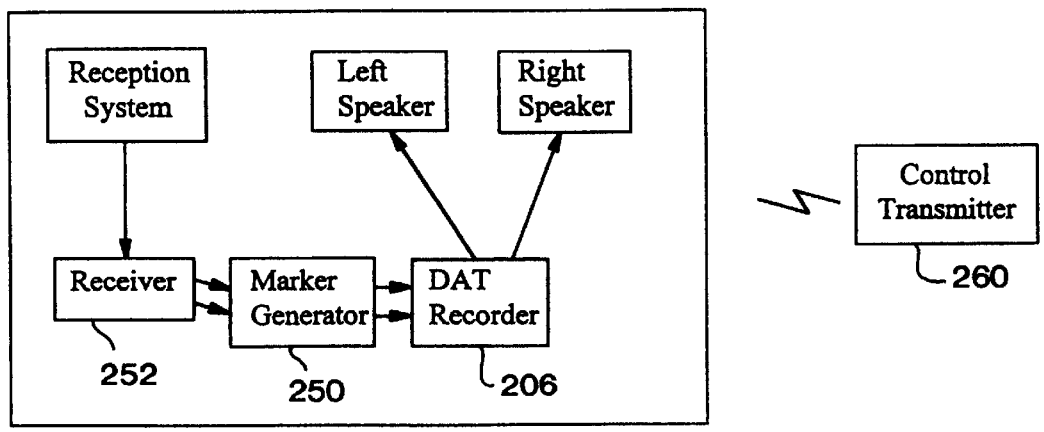
FIG. 8 is a schematic diagram of the hardware layout of a test vehicle.

Once the audio and video recordings have been captured and stored, they are synchronized using one of a variety of methods. Synchronizing the files generally involves the process of cutting the files so that they start at the same point in time and extend for the same length of time. One preferred method for synchronizing the audio files is to embed markers in the audio recordings during the test phase, for example, by playing a signal or tone at the desired starting point that is recorded along with the audio output. The markers can be used to quickly locate the starting point of the files during the synchronization process. The markers can be embedded in the recordings in several ways. The preferred method is to provide each test vehicle with a marker generator 250 that is triggered remotely by an FM signal. The FM signal is generated by a control transmitter 260 located in the reference vehicle or one of the test vehicles. As shown schematically in FIG. 8, the marker generator 250 is connected between the receiver 252 and the DAT recorder 206. The marker generator 250 includes conventional FM receiving circuitry (not shown) operatively coupled with conventional signal generating circuitry (not shown) in a conventional manner. The marker generator 250 is designed to trigger the signal generating circuitry upon recognition of the start signal. The marker generators 250 in each vehicle are designed to be triggered by the same reference signal. Accordingly, the marker generators 250 are simultaneously triggered upon transmission of the start signal by a control transmitter 260. The control transmitter 260 is a conventional FM transmitter having the ability to transmit the FM start signal. More specifically, upon actuation, the control transmitter 260 transmits an FM signal at a predetermined frequency, such as a 0.5 second tone at 18 KHz, in a conventional manner. This signal is broadcast with enough power reach each of the marker generators 250 in the vehicles. Upon recognition of the FM signal generated by the control transmitter 260, the marker generators 250 trigger the signal generating circuitry to create a pulse, spike or other distinctive marker that is embedded in the audio output being fed into the DAT recorder 206. This marker is recorded along with the audio output by the DAT recorder 206. If desired, each marker generator 250 can be configured to generate a different pulse, spike or marker in the audio recording, thereby permitting the audio recording to be quickly and easily associated with a particular marker generator 250 and consequently a particular test vehicle and test system. During preparation for analysis, the markers can provide an audible and visual indication that can be used to synchronize the various recordings. In the preferred embodiment, the audio software is used to view a plot of the frequency and relative amplitude of the audio files. By visually inspecting this plot, the user can locate the marker and cut the audio file so that it begins immediately at (or after) the marker. Once the beginning is cut to the starting point, the end of the audio file can be cut so that it extends for the desired length of time. The process is repeated until all of the audio files have been cut to start at the same time with respect to the marker and run for the same amount of time thereafter. With this method, the video file is preferably synchronized by comparing the time/date stamp on the video recording with the time/date stamp on the DAT recorders 206. The video files can be synchronized by either capturing a portion of the video recording that encompasses the desired section and cutting it to start and stop at the same time as the synchronized audio files (based on the time/date stamps of the audio and video files) or by using the time/date stamps to start and stop the video capture process at the same starting and stopping times as the synchronized audio files.

A second method for embedding a marker in the audio recordings is to broadcast the marker over the FM frequency that is being played by the audio systems. The marker is broadcast by a conventional FM transmitter with enough power to reach each of the test vehicles. The marker will automatically be recorded with the audio output and can later be used as a reference point for synchronizing the audio files.

Another method for synchronizing the audio and video files is to synchronize them during the capture process. In this method, the capture process is started and stopped at the same times for each file. This method is similar to one of the methods described above in connection with the synchronization of the video file, and relies on use of the time/date stamp of the audio and video recorders. Accordingly, to utilize this method, it is important to synchronize the internal clocks for the video recorder and each of the DAT recorders prior to the recording process. Once this is done, the video and DAT recorders can be set to automatically provide the recordings with synchronized time/date stamps. The recordings can then be captured as audio and video files with the capture process starting and stopping at the same times for each recorder based on the time/date stamp provided with the recordings.

Yet another method for synchronizing the files is to use a remote control for starting and stopping the video recorder and the DAT recorders. With this method, the remote control is capable of transmitting start and stop signals that are recognized by the video recorder and each of the DAT recorders. Accordingly, all of the recorders will start and stop recording simultaneously and the resulting recordings will be automatically synchronized. The remote control preferably operates using conventional wireless technology, such as UHF or FM signals that are capable of reaching the video and DAT recorders in all of the vehicles at any point during the test route. For this method to function, the video recorder and the DAT recorders must be capable of receiving and responding to the control signals.

IV Playback and Analyzing the Test Data

Once the audio files have been captured and synchronized, they are ready for playback and analysis. Playback is provided using primarily off-the-shelf audio and video software that is preferably controlled by customized management software. The management software facilitates comparison and analysis of the audio and video files by coordinating operation of the audio and video software and providing a variety of useful playback modes. In the described embodiment, Windows Media Player (standard with Windows) is used to play the audio and video files, and SpectraLab software available from Sound Technology, Inc. is used to plot the relative amplitude of the audio files. The SpectraLab software has the ability to analyze and separately plot in real-time the relative amplitude of the left and right stereo channels of an audio signal over a range of frequencies, such as 0.0 KHz to 20.0 KHz. The SpectraLab plots are generally conventional and they show time along the horizontal axis, frequency along the vertical axis and relative amplitude based on color/intensity of the plotted point. Windows Media Player and SpectraLab are capable of interacting with other software, such as the management software, using conventional calling techniques. For example, Windows Media Player is capable of playing both audio or video files at the direction of other software. The Windows Media Player can even be directed to start playback at a specified time in the file. Similarly, SpectraLab has the ability to start and stop real-time analysis of audio input at the direction of other software. SpectraLab also has the ability to return the results of its analysis to the calling software. Methods for controlling these and other audio and video software packages are well-known to those skilled in the art and will not be described in detail. It should also be noted that Windows Media Player and SpectraLab are merely exemplary and may be replaced by other conventional audio and video software.

Figure 5:
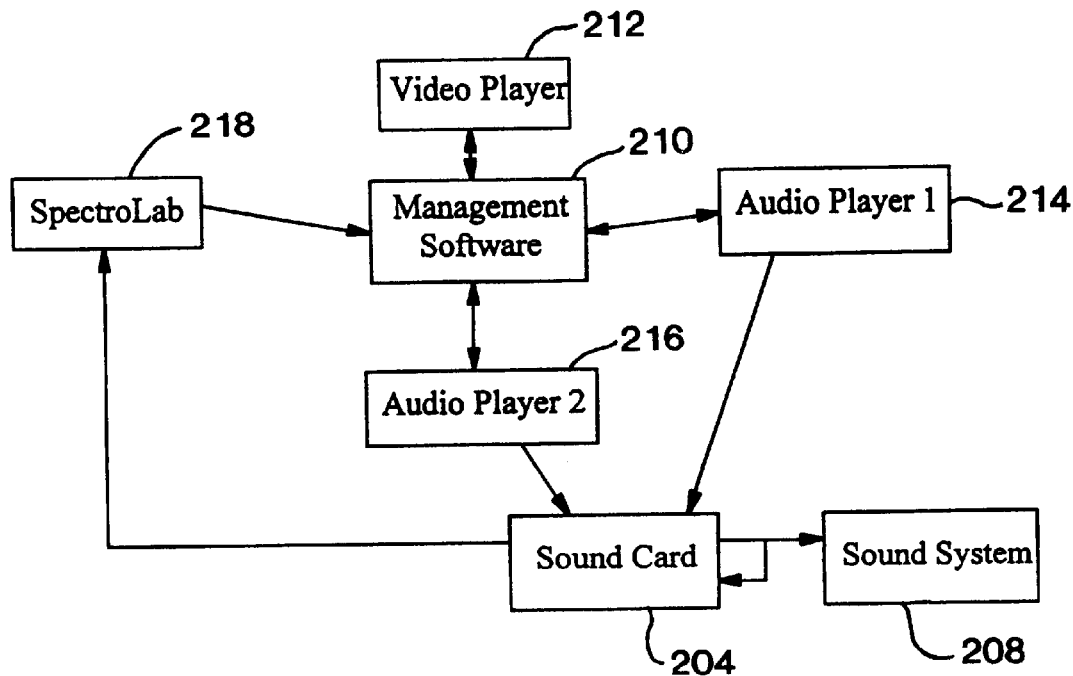
FIG. 5 is a schematic diagram of the playback/analysis software layout of the present invention.
Figure 4:
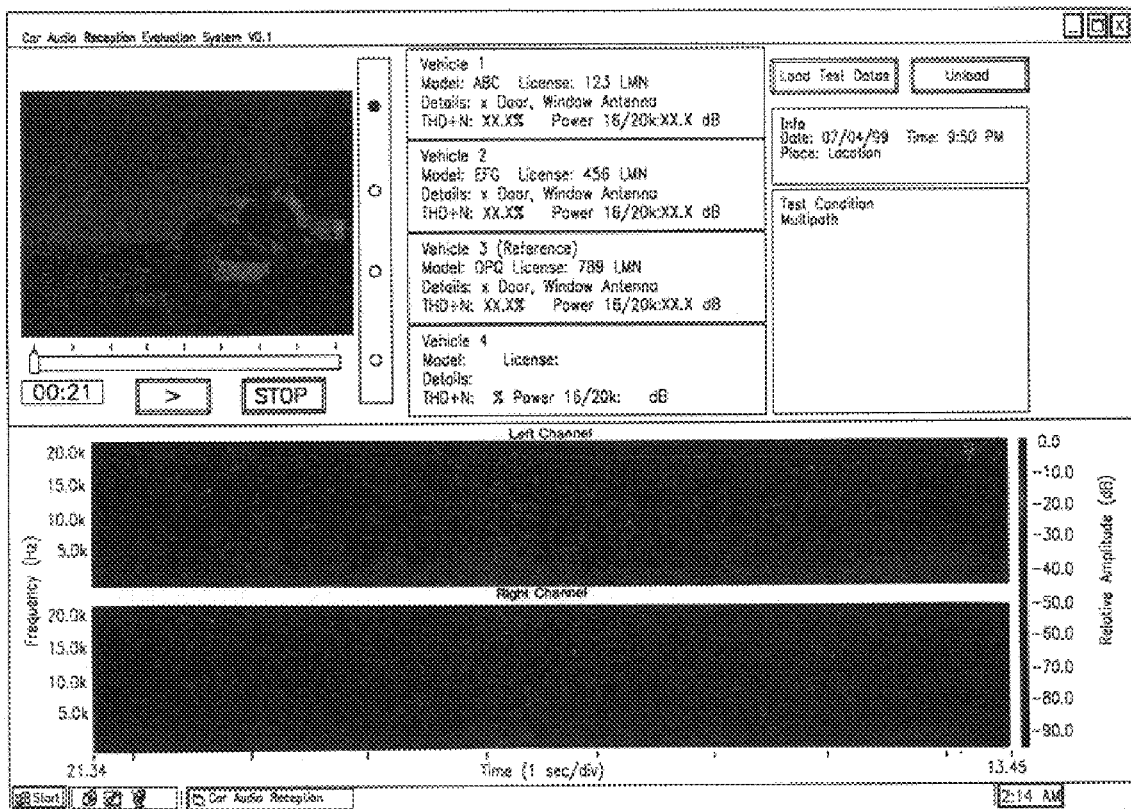
FIG. 4 is a screen image of the management software of the present invention.

In general, the management software is used to select the appropriate audio and video files and to control the playing and plotting of these files by SpectraLab and Windows Media Player. The management software is relatively simple in operation and design, and is easily implemented in any of a variety of programming languages by one skilled in the art. In the preferred embodiment, the management software is written in Visual Basic, and provides a variety of modes for listening to the audio files and playing the video files. The user or analyst preferably controls the management software using a generally conventional GUI interface that permits the analyst to select and move between various modes of operation. The overall function of the management software will be described in connection with FIGS. 4 and 5. FIG. 4 is a screen image showing the main screen 100 of the management software. As shown, the screen includes a video window 102 for displaying the video file during playback, an audio window 104 for displaying a plot of the relative amplitude of the left and right stereo channels of an audio file, a file identification area 106 for identifying the various audio files loaded into the system, and an information area 108 for presenting information describing or identifying the test. The screen image illustrated in FIG. 4 is merely exemplary and will vary from application to application with the design and construction of the GUI interface. The screen layout and available control options will vary from application to application. The general software layout is illustrated in FIG. 5. As shown, the management software 210 opens Video Player 212, two instances of Audio Player 214, 216 and SpectraLab 218.

Upon start-up, the management software opens an instance of Windows Media Video Player ("Video Player") to create video window 102 and an instance of SpectraLab to create audio window 104 (See FIG. 5). As shown in FIG. 4, these two windows 102, 104 are integrated into the main screen 100 and are part of the GUI interface of the management software. The management software also open two instances of Windows Media Audio Player ("Audio Player"). These two Audio Players remain hidden and permit up to two audio files to be played simultaneously as directed by the management software. During playback, the Audio Players will provide output to the sound card. The output of the sound card is connected to the sound system to provide audio output. In addition, the sound card output is connected back to the sound card input, for example, by conventional audio cables extending between the audio output and input jacks. The audio output is fed back into the sound card to permit the audio signals to be fed to and analyzed in real-time by the SpectraLab software. This functionality is permitted by the use of a full duplex sound card.

In operation, the analyst must first identify the audio and video files to be analyzed. In the preferred embodiment, the audio and video files along with any textual description to be displayed by the management software are stored in an ".ini" file. The ".ini" file is a text file listing the specific audio and video files and any desired textual information. For example, the ".ini" file will list the file name and location for all audio files recorded during a particular test as well as the file name and location of the corresponding video file. Further, the "ini" file may include information identifying each of the files, as well as information about the test, the systems tested and any desired test conditions. This information may be displayed by the management software as desired. The ".ini" file is typically created after the files have been synchronized. Instead of the ".ini" file, the audio and video files as well as any desired textual information can be input by the analyst directly into the management software. However, the ".ini" file is preferable in most applications because once it is built, the information need not be entered again and the user can load the entire collection of files and related information by simply selecting the appropriate ".ini" file from within the management software. The ".ini" can be created in advance by a specialist so that the analyst is not required to enter any of the information.

Once specified by the analyst, the management software reads the ".ini" file and opens the audio and video files identified therein. In addition, the management software may integrate any information contained in the ".ini" file into the GUI interface.

After the files have been opened, the management software permits the audio and video files to be played back in a variety of different modes of operation. In perhaps the most basic mode of operation, the management software permits the analyst to listen to and plot a single audio file while simultaneously viewing the corresponding video file. The management software sends a command to a single Audio Player directing that Audio Player to play a specified audio file so that the audio is output to the sound card and in turn to the sound system. The sound card output is also fed back into the sound card input so that it can be analyzed and plotted in real-time by the SpectraLab software. The management software also sends a command to the Windows Viewer directing that Viewer to play the corresponding synchronized video at the same time as the audio files are being played. This permits the analyst to view the environmental conditions occurring when the audio recordings were made. Accordingly, the analyst can discount or otherwise take into consideration noise caused by environmental conditions, such as bad weather, travel under an overpass, movement adjacent a power line and the like. Further, the management software sends a command to SpectraLab directing SpectraLab to provide real-time analysis and plot the audio signal entering the sound card. Start and stop commands are sent to SpectraLab whenever the Audio Player is started or stopped.

The management software also preferably permits the analyst to start the playback at any particular time in the audio and video files. For example, the analyst may want to playback a file beginning 30 seconds into the recording. To provide this option, the management software sends a command to Audio Player directing it to play the appropriate audio file beginning at the specified time in the file. Also, the management software directs the Video Player to play the corresponding video, also file beginning at the specified time in the file. If SpectraLab analysis is also desired, the management software directs the SpectraLab software to start and stop real-time analysis as the Audio Player is directed to start and stop.

To facilitate comparison of different audio files, the management software permits the analyst to switch back and forth between the various audio files. For example, the management software preferably includes an "A/B" mode of operation in which the analyst can rapidly switch back and forth between two separate audio files. In this mode of operation, the analyst pre-selects to two files and once playback has started, indicates when to switch between the two files. In this mode of operation, the management software utilizes a single Audio Player. The management software sends a command to the Audio Player directing it to play the first audio file and a command to the Video Player directing it to play the corresponding video file. When the analyst inputs the command to switch audio files, the management software sends a command directing the Video Player and the Audio Player to stop. The management software also queries the Audio Player to determine the time in the file at which play stopped. The management software then sends a command to the Audio Player directing it to play the second audio file beginning at the time in the file at which the first audio file stopped. It also sends a command to the Video Player directing it to again play the video file, also beginning at the time in the file at which the first audio file stopped. The process of switching files is so rapid that the transition is made without any perceptible delay. The process can be repeated and reversed to switch back and forth between the two files as desired. If desired, additional audio files can be incorporated into the process, for example, permitting the user to cycle between three or more audio files. If SpectraLab analysis and plotting is desired, the management software directs the SpectraLab software to start and stop real-time analysis as the Audio Player is directed to start and stop.

Figure 6:
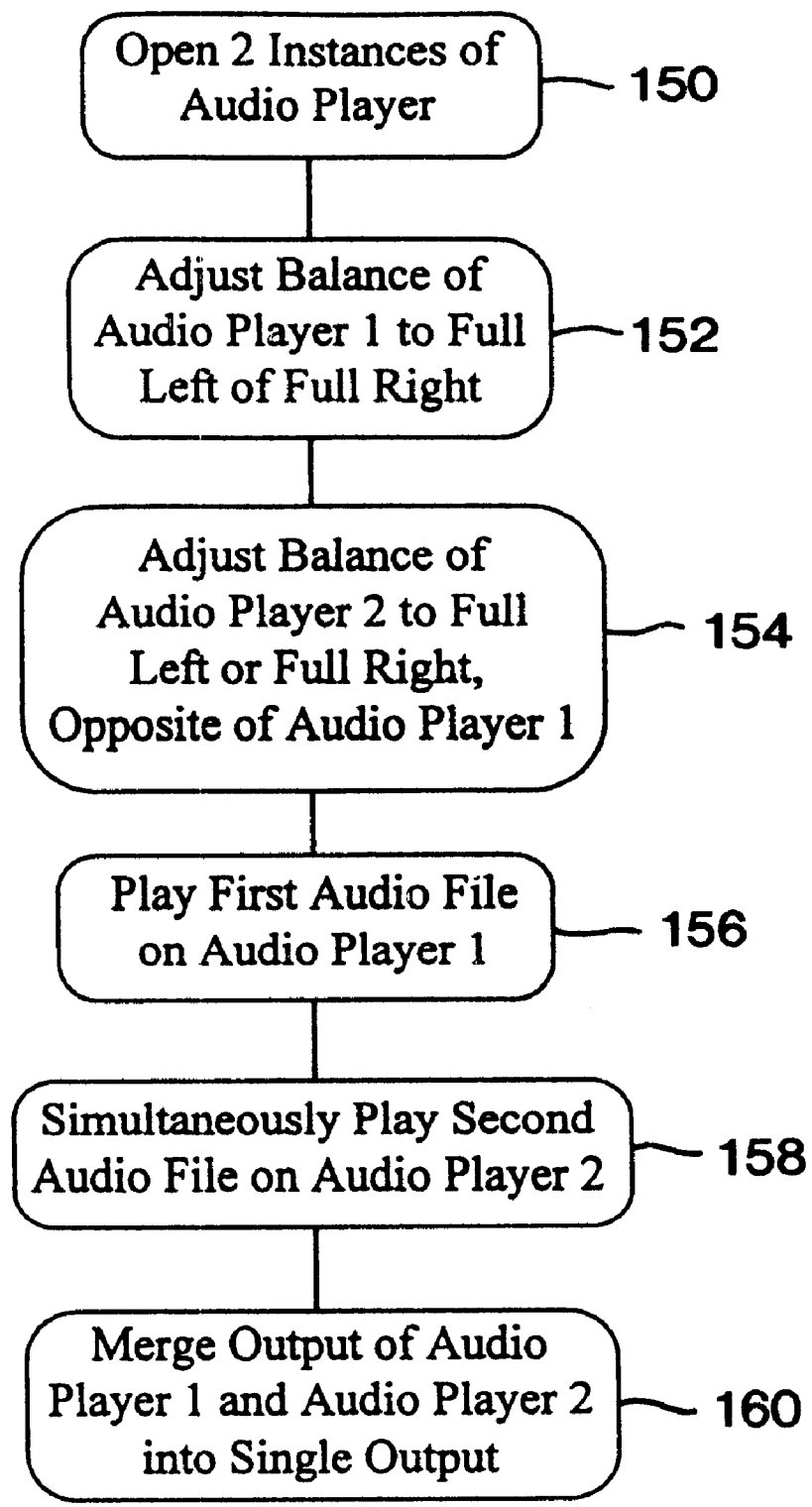
FIG. 6 is a flow chart showing the general steps of the audio file merge method of the present invention.

In another mode of operation, the management software utilizes two Windows Audio Players to merge the left or right channel of one audio file with the opposite channel of a second audio into a single stereo signal. When this merged signal is received by the SpectraLab software, the left and right channel plots will actually show and permit comparison of the two different audio files. In operation, the management software generates the merged audio signal by: (a) opening 150 two instances of Audio Player (if not already open), (b) adjusting 152 the balance of the first Audio Player 214 to full left of full right, (c) adjusting 154 the balance of the second Audio Player 216 to full left or full right, opposite the first Audio Player 214, (d) playing 156 the first audio file with the fist Audio Player 214, (e) simultaneously playing 158 the second audio file with second Audio Player 216, and (f) merging 160 the output of the first and second Audio Players 214, 216 into a single output signal. More specifically, the management software sends commands to two Audio Players directing each to play one of the two audio files to be merged (See FIG. 6). The management software also sends a command to the first Audio Player adjusting its balance so that only the right channel is played and a command to the second Audio Player adjusting its balance so that only the left channel is played, or vice versa. Windows automatically merges the output of the two Audio Players when they are played simultaneously without any intervention or direction from the management software. Accordingly, when the two Audio Players are playing, a single merged output signal is sent to the sound card with the output of one Audio Player in one stereo channel and the output of the other Audio Player in the other stereo channel.

The GUI interface of the management software permits the analyst to easily select the desired channels of the desired files, for example, through the use of input buttons that can be selected with an input device such as a mouse. When the audio files are played, the merged audio output is played over the sound system allowing the analyst to compare their respective signals by comparing the output of the left and right speakers. Further, the management software can start and stop SpectraLab as desired to plot the merged audio file. Because SpectraLab separates and individually plots the left and right stereo channels of the audio input, it automatically separates and plots the two audio files. This permits the analyst to visual compare the two channels of the two audio files in real-time, seeing and comparing noise as it occurs in the two merged audio files. In addition, in this mode of operation, the management software directs the Video Player to play the video file at the same time as the Audio Player is directed to play the merged audio file. As a result, the Video Player plays the video file synchronized with the audio files. Playback of the merged audio files and video files can be started and stopped at the desired times in the files as discussed above.

In yet another mode of operation, the management software permits the analyst to repeatedly playback a selected portion or loop of the audio and video files. This capability can be used with merged audio from two separate audio files or with full audio from a single audio file. The management software receives. input from the analyst indicating the starting time and ending time of the playback loop. The management software then sends a command to the Audio Player (or two Audio Players in merged operation) directing it to play the audio file beginning at the specified loop starting time. A second command is sent to the Video Player directing it to play the video file beginning at the specified loop starting time. Once playback has started, the management software repeatedly queries the Audio Player, for example, every 0.5 seconds, to determine the time the Audio Player is within the audio file. Each time a value is returned by the Audio Player, the management software compares it with the specified loop ending time. When the management software determines that the Audio Player has reached the loop ending time, the management software sends stop commands to the Audio Player and Video Player. The management software then sends commands to the Audio Player and Video Player directing them to start playing the audio and video files at the specified loop starting time. The process repeats as desired. The SpectraLab software can be used to analyze and plot the looped audio output by sending appropriate start and stop commands to SpectraLab when the Audio Player is started and stopped.

In a further mode of operation, the "A/B" and "Loop" modes of operation are combined to permit the analyst to repeatedly listen to a selected portion of the audio files, while selectively switching between the various audio files as desired.

In use, the analyst will select the desired playback mode. One skilled in the art will readily appreciate that the playback modes described herein are merely exemplary and that a wide variety of additional playback modes are possible. For example, additional modes of operation are available by combining the various modes of operation discussed above. The analyst is then able to compare and contrast the audio output from the various audio files to provide a quality comparison of the different tested systems. For example, the analyst can compare and contrast the presence and extent of noise, interference, fade out or other conditions in the various audio files. These conditions are readily discernable by those skilled in the art. To aid this comparison, the analyst can compare and contrast the relative amplitude plots provided by SpectraLab. As noted above, the plots permit the analyst to essentially "see" noise as well as to compare the signal level of various audio files. Further, by viewing the video file while simultaneously listening to the audio files, the analyst is able to consider and account for environmental conditions that may have impacted the quality of sound produced by the tested systems.

V. Automatic Rating Process

In an effort to further reduce the subjectivity of the analysis process, the management software also provides the ability to automatically rate the quality of an audio file, or a portion of an audio file, of a recorded FM broadcast. In general, the automatic rating process involves an analysis of noise present at frequencies above the normal modulating frequency of the recorded broadcast signal. With the exception of a pilot signal broadcast at 19 KHz, desired sound in FM signals is typically modulated at or below 15 KHz. Because of this, any signal present above 15 KHz and below 19 KHz can, for purposes of rating, be presumed to be noise.

Accordingly, an indication of the amount of noise in a particular recorded signal can be determined by summing, averaging or otherwise considering the relative amplitude of any signals present in that range. This process of computing the relative amplitude of signal over this entire range for even small portions of an audio file would require immense amounts of computer processing. Because of this, the present invention preferably uses a shorthand method for analyzing the noise present above 15 KHz. The shorthand method is to consider the level of the signal at only a single frequency in the 15 KHz to 19 KHz range, such as 17 KHz, rather than the entire range. This method has proven to provide an effective and meaningful rating. Because the level of a signal at any given frequency will vary with the volume setting of the system as it is being recorded, a straight comparison between different systems would only be meaningful if the different systems were set to the same volume during the recording process. To account for this problem without requiring the recorded systems to be set to the same volume setting, the present invention considers the relative amplitude of the pilot signal broadcast at 19 KHz when computing the automatic rating. This is possible because the level of the pilot signal, like the level of noise, increases and decreases with the volume setting of the test system. Therefore, in the preferred embodiment, the automatic rating system rates a recorded FM broadcast by comparing the signal level at 19 KHz with the signal level at 17 KHz. More particularly, the management software computes a relative rating by subtracting the average relative amplitude of the signal at 17 KHz from the average relative amplitude of the signal at 19 KHz. This process is facilitated by SpectraLab, which has the ability to compute in real-time the average relative amplitude of an audio signal over a range of frequencies or at any given frequency. Accordingly, to automatically rate a particular audio file, the management software sends a command to the Audio Player directing it to play the portion of a file to be rated and also sends a command to SpectraLab directing it to separately compute, in real-time, the average amplitude of the input signal at 17 KHz and the average amplitude of the signal at 19 KHz. When the audio file or the portion of the audio file to be rated is complete, the management software sends commands to the Audio Player and SpectraLab directing them to stop. The management software also queries SpectraLab to return the computed average values at 17 KHz and 19 KHz. When the values are returned, the management software subtracts the computed average amplitude at 17 KHz from the computed average amplitude at 19 KHz to provide a relative rating. The identical portion of the next audio file can then be processed in an identical manner to provide a relative rating for that audio file. The process can be repeated for any additional audio files. The relative ratings for each audio file can be compared to provide a meaningful representation of the amount of noise present in the automatically rated files, in turn providing a relative rating of the relative quality of the tested components.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a","an","the" or "said", is not to be construed as limiting the element to the singular.

The embodiments of the invention in which an exclusive property or privilege is claimed are defined as follows:

1. A method for testing vehicle components with signal reception capabilities, comprising the steps of:
   providing a first vehicle with a first component and a first recording means for recording signals from the first component;
   providing a second vehicle with a second component and a second recording means for recording signals from the second component;
   providing at least one of the first and second vehicles with a video recording device;
   traveling through a test route with both the first vehicle and the second vehicle in close proximity to one another;
   simultaneously recording a first audio recording of output from the first component with the first recording means and a second audio recording of output from the second component with the second recording means during at least a portion of said traveling step;
   recording a video recording during the portion of said traveling step simultaneously with said simultaneous recording step; and
   comparing the first audio recording, second audio recording and video recording to obtain a relative quality evaluation of the first component and the second component.

2. The method of claim 1 further comprising the steps of:
   capturing the audio recording of the first component in a computer as a first audio file; and
   capturing the audio recording of the second component in the computer as a second audio file.

3. The method of claim 2 further comprising the step of capturing the video recording in the computer as a video file.

4. The method of claim 3 wherein said comparing step includes the steps of:
   playing back with a computer at least portions of the first audio file and the second audio file; and
   playing back with a computer at least portions of the video file, the video file playback being synchronized with the audio file playback whereby environmental conditions encountered while recording the first audio recording and the second audio recording can be viewed simultaneously with the playback audio file playback of the audio recordings created under those environmental conditions.

5. The method of claim 4 further comprising the step of synchronizing the first audio file with the second audio file.

6. The method of claim 5 further comprising the step of synchronizing the video file with the first and second audio files.

7. The method of claim 6 wherein said step of synchronizing the first and second audio files includes the step of cutting at least one of the first and second audio files in a computer so that the first and second audio files begin and end at substantially the same points in time.

8. The method of claim 7 wherein said step of synchronizing includes the step of embedding a marker in the first and second audio files during said simultaneous recording step.

9. The method of claim 8 wherein said step of synchronizing the video file with the first and second audio files includes the step of cutting the video file in a computer so that it begins and ends at substantially the same points in time as the first and second audio files.

10. The method of claim 9 wherein said comparing step includes the step of computing and displaying in a computer data indicative of the signal level at various frequencies of at least portions of the first audio file and the second audio file, the computing and displaying step occurring in real-time during playback of the first audio file and the second audio file.

11. The method of claim 10 wherein the data indicative of the signal level at various frequencies is further defined as relative amplitude.

12. The method of claim 11 wherein said computing and displaying step is further defined as:

merging in a computer a first stereo channel of the first audio file with a second stereo channel of the second audio file to generate a merged audio output;

computing and displaying in a computer a relative amplitude of at least portions of the first audio file contained in the first stereo channel of the merged audio output; and computing and displaying in a computer a relative amplitude of at least portions of the second audio file contained in the second stereo channel of the merged audio output, both of said computing and displaying steps occurring in real-time during playback of the first audio file and the second audio file.

13. A method for recording and playing back data for comparing vehicle components with signal reception capabilities, comprising the steps of:

recording audio output from a first component while traveling a test route, the first component generating output from a broadcast signal at a frequency;

recording audio output from a second component simultaneously with said first audio recording step while traveling the test route, the second component generating output from the broadcast signal at the frequency;

recording video of environmental conditions encountered while traveling the test route simultaneously with said first and second audio recording steps;

playing back at least selected portions of the recorded audio output from the first component and the recorded audio output from the second component; and playing back at least selected portions of the recorded video corresponding to the played-back portions of the recorded audio output from the first component and the recorded audio output from the second component, the playing back of the recorded video occurring simultaneously with and in synchronized relationship to the corresponding portions of the played-back portions of the recorded audio output from the first component and the recorded audio output from the second component.

14. The method of claim 13 further comprising the steps of:

capturing the recorded audio output from the first component in a computer as a first audio file;

capturing the recorded audio output of the second component in the computer as a second audio file; and wherein said audio playback step is further defined as playing back, in the computer, at least selected portions of the first audio file and the second file.

15. The method of claim 14 further comprising the step of capturing the recorded video in the computer as a video file, said video playback step being performed in the computer.

16. The method of claim 15 further comprising the step of computing and displaying in a computer data indicative of the signal level at various frequencies of at least portions of the first audio file and the second audio file, the computing and displaying step occurring in realtime during said audio playback of the first audio file and the second audio file.

17. The method of claim 16 further comprising the step of synchronizing the first audio file with the second audio file.

18. The method of claim 17 further comprising the step of synchronizing the video file with the first and second audio files.

19. The method of claim 18 wherein said the step of synchronizing the first and second audio files includes the step of cutting at least one of the first and second audio files in a computer so that the first and second audio files begin at the same point in time during the simultaneous recording step.

20. The method of claim 19 wherein said the step of synchronizing the first and second audio files includes the step of cutting at least one of the first and second audio files in a computer so that the first and second audio files end at the same point in time during the simultaneous recording step.

21. The method of claim 20 wherein said the step of synchronizing the video file with the first and second audio files includes the step of cutting the video file in a computer so that it begins and ends at the same point in time during the recording step as the first and second audio files.

22. The method of claim 21 wherein the data indicative of the signal level at various frequencies is further defined as relative amplitude.

23. The method of claim 22 wherein said computing and displaying step includes computing and displaying relative amplitude of at least selected portions of the first audio file simultaneously with corresponding portions of the second audio file.

24. The method of claim 22 wherein said computing and displaying step is further defined as:

merging in a computer a first stereo channel of the first audio file with a second stereo channel of the second audio file to generate a merged audio output;

computing and displaying in a computer a relative amplitude of at least portions of the first audio file contained in the first stereo channel of the merged audio output; and computing and displaying in a computer a relative amplitude of at least portions of the second audio file contained in the second stereo channel of the merged audio output, both of said computing and displaying steps occurring in real-time during playback of the first audio file and the second audio file.

25. A method for comparing the quality of reception system, comprising the steps of:

providing a first vehicle with an audio system and a first reception system to be tested;

providing a second vehicle with an audio system and a second reception system to be tested;

traveling through a test route with the first vehicle and the second vehicle in close proximity to one another;

simultaneously recording output from the first audio system and the second audio system during said traveling step with the first and second audio systems producing output from a predetermined frequency;

recording video of environmental conditions encountered by the first and second vehicles during said traveling step;

playing back at least selected portions of the recorded audio output from the first audio system and the recorded audio output from the second audio system;

playing back at least selected portions of the recorded video corresponding to the played-back portions of the recorded audio output, the playing back of the recorded video occurring simultaneously with and in synchronized relationship to the corresponding portions of the played-back portions of the recorded audio output; and comparing the recorded output from the. first audio system with the recorded output from the second audio system in view of the recorded video to obtain a relative quality evaluation of the first reception system and the second reception system.

26. The method of claim 25 wherein the audio system of the second vehicle is substantially identical to the audio system of the first vehicle, whereby differences noted during said comparing step are attributable to differences between the first and second reception systems.

27. A method for testing vehicle components with signal reception capabilities, comprising the steps of:

recording audio output from a first component while traveling a first test route, the first component generating output from a first broadcast signal;

recording audio output from a reference component simultaneously with said first audio recording step while traveling the first test route, the reference component generating output from the first broadcast signal;

recording audio output from a third component while traveling a second test route, the first component generating output from a second broadcast signal;

recording audio output from the reference component simultaneously with said third audio recording step while traveling the second test route, the reference component generating output from the second broadcast signal;

playing back at least selected portions of the recorded audio output from the first component and the simultaneously recorded audio output from the reference component;

playing back at least selected portions of the recorded audio output from the third component and the simultaneously recorded audio output from the reference component; and comparing a relative quality of the first audio recording and the simultaneously recorded audio output from the reference component with a relative quality of the third audio recording and the simultaneously recorded audio output from the reference component to obtain a relative quality evaluation of the first component and the third component.

28. The method of claim 27 further comprising the steps of:

recording video of environmental conditions encountered while traveling the first test route simultaneously with said first and second audio recording steps;

recording video of environmental conditions encountered while traveling the second test route simultaneously with said third and fourth audio recording steps;

wherein said playback step further includes playing back at least selected portions of the recorded video corresponding to the played-back portions of the recorded audio output from the first component and the recorded audio output from the third component, the playing back of the recorded video occurring simultaneously with and in synchronized relationship to the corresponding portions of the played-back portions of the recorded audio output from the first component and the recorded audio output from the third component; and said comparing step includes considering the played-back portions of the recorded video when comparing the first audio recording and the simultaneously recorded audio output from the reference component and when comparing the third audio recording and the simultaneously recorded audio output from the reference component.

* * * * *